United States Patent [19]
Lewis et al.

[11] Patent Number: 5,364,431
[45] Date of Patent: Nov. 15, 1994

[54] APPARATUS FOR PRODUCTION OF GLASS FIBERS UTILIZING SPINNING CUP STRUCTURE

[75] Inventors: Albert Lewis, Covina, Calif.; Cenek A. Kottnauer, W. Vancouver, Canada

[73] Assignee: Glass Incorporated International, Chino, Calif.

[21] Appl. No.: 231,110

[22] Filed: Apr. 22, 1994

Related U.S. Application Data

[62] Division of Ser. No. 905,456, Jun. 29, 1992, Pat. No. 5,314,521.

[51] Int. Cl.$^5$ ............................................. C03B 37/04
[52] U.S. Cl. ........................................ 65/488; 65/162; 65/509; 65/521
[58] Field of Search ................ 65/6, 14, 12, 29, 162

[56] References Cited

U.S. PATENT DOCUMENTS

| | | | |
|---|---|---|---|
| 3,236,099 | 2/1966 | Warthen | 65/29 X |
| 3,252,777 | 5/1966 | Levecque et al. | 65/14 |
| 3,304,164 | 2/1967 | Charpentier et al. | 65/14 |
| 4,203,748 | 5/1980 | Battigelli et al. | 65/14 |
| 4,661,135 | 4/1987 | Mosnier | 65/14 |
| 4,718,930 | 1/1988 | Gartner | 65/6 |

*Primary Examiner*—Robert L. Lindsay
*Attorney, Agent, or Firm*—Boniard I. Brown

[57] ABSTRACT

A method and apparatus for producing glass fibers wherein molten glass is deposited onto a spinning cup structure. Centrifugal force urges the molten glass outwardly and upwardly along the inner surface of an upstanding wall of the cup structure. The glass is then extruded through small holes in the cup wall. A downflowing stream of hot gas passes downwardly along the outer surface of the cup wall to turn the fibers downwardly while producing an attenuation (reduction) of fiber diameter. The lower portion of the cup side wall is heated to achieve greater temperature uniformity of the fibers as they are formed. A cool gas curtain is formed about the downflowing hot gas stream to somewhat concentrate the hot gas stream for more uniform heating of the downflowing glass fibers.

2 Claims, 2 Drawing Sheets

FIG.—1

APPARATUS FOR PRODUCTION OF GLASS FIBERS UTILIZING SPINNING CUP STRUCTURE

This is a divisional of copending application(s) Ser. No. 07/905,456 filed on Jun. 29, 1992 now U.S. Pat. No. 5,314,521.

BACKGROUND OF THE INVENTION

1. Field of the Invention

The present invention relates to a method and an apparatus for forming glass fibers by feeding molten glass onto the bottom wall of a spinning cup, whereby the glass is urged by centrifugal force outwardly along the cup bottom wall and upwardly on the cup side wall for extrusion through holes in the side wall. The general method is sometimes referred to as rotary fiberizing.

2. Prior Art Developments

Our issued U.S. Pat. No. 4,767,431 relates to a method of forming glass fibers wherein solid glass pellets are deposited onto a rotating spinner disc heated to maintain the pellets in a semi-solid state. The softened pellets are thrown outwardly by centrifugal force against a side wall on the disc periphery. The soft semi-liquid glass is extruded outwardly through small holes in the disc side wall into a downflowing stream of hot gas surrounding the spinning disc structure. The extruded glass fibers are thereby turned or deflected for downflowing movement with the hot gas stream. The hot gas pulls or stretches the individual fibers so that the fiber diameters are reduced or attenuated to a desired size range.

In another version of the process, the glass material is deposited onto the spinning disc structure as a molten stream of glass, which remains in a molten state as it passes through the holes in the side wall of the disc structure. A problem with this method is the potential plugging of the holes (orifices) in the disc side wall. Unless the glass temperature is well above the devitrification point, the glass may crystallize, thereby plugging the extrusion holes (orifices).

SUMMARY OF THE INVENTION

The present invention relates to a rotary disc technique for forming glass fibers wherein the glass is introduced to the rotary disc in a molten stream, which is preferably gravitationally deposited onto the disc structure at a location spaced an appreciable distance radially outwardly from the disc structure spin axis, The molten glass thus has only a relatively short distance to travel before reaching the lowermost holes in the upstanding side wail of the disc structure. Accordingly, the lowermost holes are maintained in a relatively hot condition by the upward flow of molten glass along the annular side wall.

In a preferred practice of the invention, the upstanding side wall of the spinning disc structure has an appreciable vertical dimension, whereby a relatively large number of extrusion holes (orifices) are provided in a given diameter disc structure. The hollow disc structure thus has the appearance of a shallow circular cup. Therefore, the term "spinning cup structure" is used herein to describe the spinning component of the rotary fiberizer.

Because the spinning cup structure has a relatively large vertical dimension, it is possible that fibers generated by glass flow through the uppermost holes will exit at a higher temperature than the fibers generated by glass flow through the lowermost holes. This is because the downflowing stream of hot gas surrounding the spinning cup structure loses some of its heat as it contacts and heats the uppermost glass fibers. The hot gas therefore exerts a somewhat lessened heating effect on the fibers generated by glass flow through the lowermost holes.

In order to obtain relatively uniform fiber temperature (i.e., fibers produced by the lower holes versus fibers produced by the upper holes), the present invention contemplates localized heating of the lower portion of the cup side wall. Such localized heating raises the temperature of the lowermost extrusion holes, and thereby compensates for the temperature gradient which might otherwise exist between the uppermost fibers and the lowermost fibers, The localized heating action is preferably accomplished by means of an annular induction heater located generally in the plane of the cup structure bottom wall.

A further improvement is the provision of an annular stream of downflowing cool gas (air) along the outer boundary of the hot gas fiber-attenuating stream. The cool gas acts as an annular curtain to guide the encircled hot gas stream, thus to minimize diffusion of the hot gas stream away from the downflowing glass fibers.

The annular cool gas curtain somewhat reduces the radial dimension of the hot gas stream and thus minimizes the temperature gradient which might otherwise exist in the radial direction. The desired temperature uniformity is advantageous in that the fiber attenuation action is somewhat more uniform, with greater uniformity of fiber diameter. The cool gas curtain also minimizes heat losses which raise the overall operating cost of the fiberizing system.

The invention has three major aims or advantages, namely to permit use of cheaper glass compositions that might not be usable in conventional fiberizing systems, to permit operation with relatively cool molten glass streams for increased service life of the spinning cup structure, and the formation of relatively uniform diameter glass fibers of relatively small diameter (size).

DESCRIPTION OF A PREFERRED EMBODIMENT OF THE INVENTION

Figure 1:
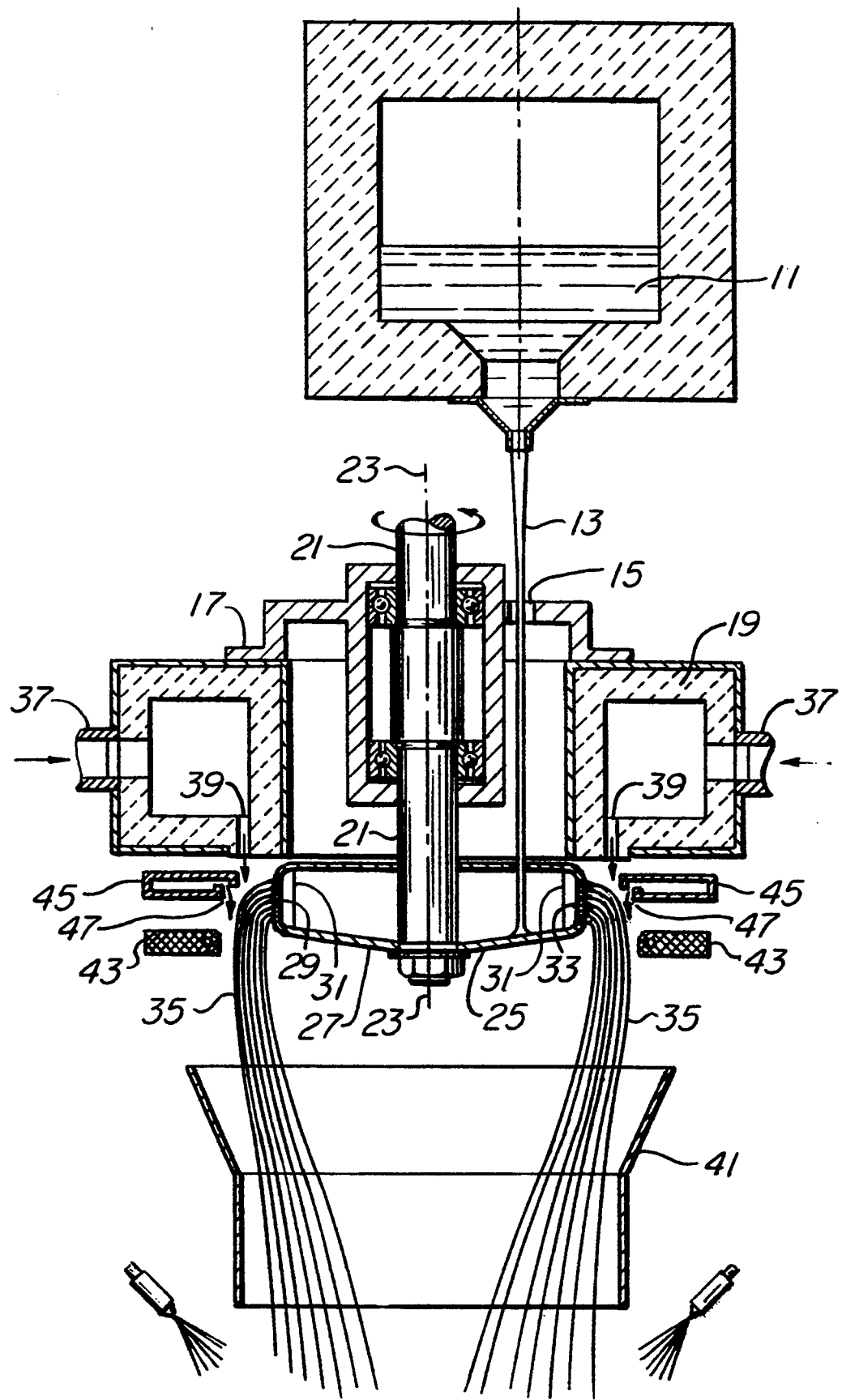
FIG. 1 is a schematic sectional view of an apparatus which can be utilized according to the present invention.

FIG. 1 illustrates a glass fiber forming apparatus where stream 13 of molten glass is gravitationally moved from a glass supply 11 downwardly through an opening 15 in a stationary structure 17 atop an annular furnace 19. Roof structure 17 constitutes bearing support means for a vertical rotary shaft 21 which extends downwardly through the annular furnace.

The upper end portion of shaft 21 is connected to an electric motor or other power source for rotation of the shaft about its axis 23. The lower end portion of shaft 21 is attached to the bottom wall 25 of a shallow cup structure 27, which rotates with the shaft about shaft axis 23. The molten glass stream 13 contacts bottom wall 26 at a location or on a circular line spaced an appreciable distance radially outwardly from the cup spin axis 23. The spinning motion of the cup structure causes the molten glass immediately to be moved by centrifugal action outwardly along bottom wall 25 and then upwardly along the surface of an annular side wall 29. A molten glass ring 31 is thus formed on side wall 29.

Side wall 29 has an array of small circular holes (orifices) 33 extending therearound, through which molten glass is continuously extruded outwardly by action of centrifugal force on the molten glass ring 31. The extruding action produces a large multiplicity of glass fibers, designated generally by numeral 35. As each glass fiber is generated by flow through a hole 33, it is flowing generally horizontally outwardly away from wall 29. Each fiber will also have a circumferential flow component because of the spinning of cup structure 27. Annular furnace 19 is adapted to heat air blown into the furnace through one or more air supply inlets 37. The heated gas or combustion product is directed downwardly through an annular outlet slot 39 to impinge on the glass fibers generated by glass flow through the small holes 33 in side wall 29. The glass fibers are thus turned downwardly to move with the downflowing hot gases.

The annular downflowing hot gas stream heats the glass fibers which otherwise would quickly cool to a solid condition. Heating of the glass fibers, together with the aerodynamic pulling effect of the gas stream on the fiber surface, attenuates or reduces the diameter of each fiber so that the fibers elongated and become thinner before passing downwardly into and through an annular bucket structure 41.

In preferred practice of the invention, all of the fibers should be at essentially the same temperature as they are generated at respective holes in wall 29. With such temperature uniformity, all of the fibers will be stretched the same amount by the action of the downflowing hot gas stream generated furnace slot 39. However, it has been found that the lowermost extrusion holes in wall 29 tend to be somewhat cooler than the uppermost holes, and the initial temperatures of the respective fibers vary accordingly.

The reason for the lack of temperature uniformity, as between the lowermost holes 33 and the uppermost holes 33, is believed to be the variable heating action of the downflowing hot gas stream. As the hot gas-strikes the uppermost glass fibers, it gives up some of its heat to those fibers and to the upper portion of wall 29. When the gas reaches the lower portion of side wall 29, it has a somewhat lower temperature. It therefore exerts a lesser heating effect on the lower portion of wall 29, in comparison with the heating effect exerted on the tapper portion of wall 29.

To achieve a reasonably uniform temperature of wall 29 from its bottom end to its top end, an annular magnetic induction heater 43 is positioned about the lower portion of cup structure 27, as shown in FIG. 1. The annular heater is located generally in the plane of the cup bottom wall 25, whereby a magnetic field generated by the heater coil passes through the lower portion of cup side wall 29, thereby producing a localized heating of the lower portion of the side wall. The upper portion of side wall 29 is not heated by annular heater 43.

The downflowing hot gas stream moves from annular slot 39 through the space circumscribed by heater 43 to control the direction of fibers 35. There is a possibility that some of the hot gas might migrate or diffuse away from the surface of wall 29 to an undesired extent. To minimize such diffusion of gas and heat away from wall 29, there is provided an annular pressurized cool gas plenum 45 occupying a horizontal plane about midway between furnace 19 and induction heater 43.

Cool gas plenum 45 has a downwardly directed gas outlet slot 47 located a slight distance radially outwardly from the hot gas stream generation slot 39. A blower (not shown) may be used to feed pressurized air into the plenum for downflow out of annular slot 47.

Slot 47 generates a downflowing stream of relatively cool gas downwardly along the outer boundary of the hot gas fiber-attenuating stream. The annular cool gas stream is spaced radially outwardly from the downflowing glass fibers so that the cool gas has no direct contact with the fibers. The annular cool gas stream acts as a guide means for the annular hot gas stream so that the hot gas is forced to flow closer to the surface of wall 29 than it otherwise might. The hot gas stream is thus somewhat more concentrated, with a reduced temperature gradient thereacross in the radial direction plane.

The presence of the cool gas curtain around the downflowing hot gas stream tends to cause the hot gas stream to produce a somewhat more uniform heating action on the glass fibers, measured in the horizontal plane. Also, the cool gas curtain tends to minimize heat loss associated with any undesired outward gas diffusion of the hot gas stream.

Figure 2:
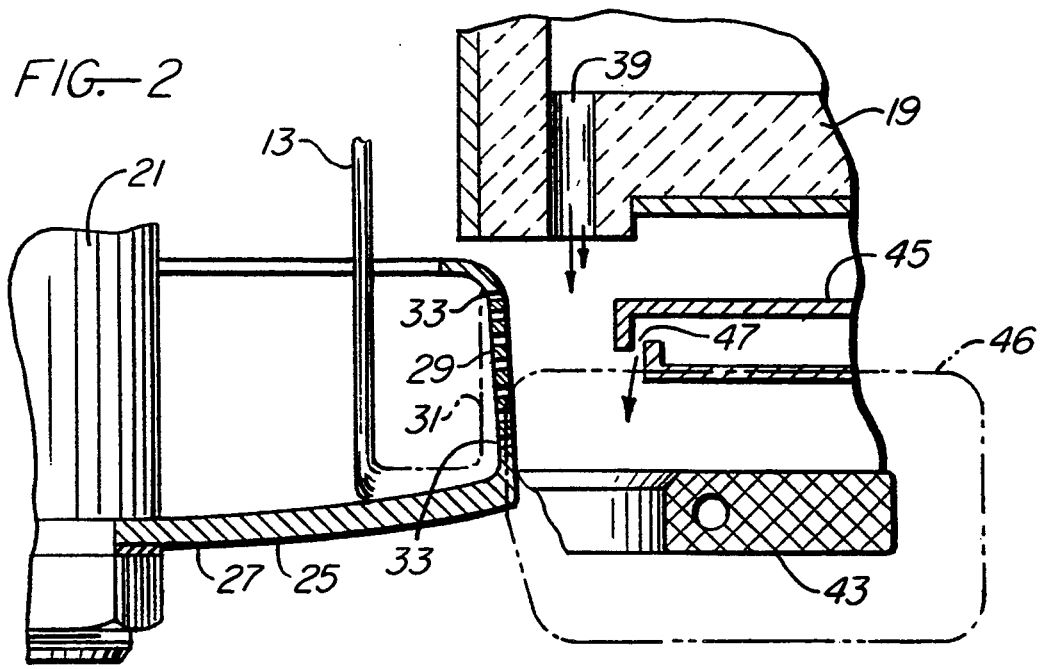
FIG. 2 is a fragmentary enlarged sectional view of part of the FIG. 1 apparatus.

FIG. 2 shows in somewhat greater detail the relationship between clip structure 27, induction heater 43, and cool gas stream generation means 45. The induction heater generates a magnetic field designated generally by numeral 46. As viewed in FIG. 2, the magnetic field passes through the lower portion of cup wall 29 to produce thereon a localized heating action. Some of the magnetic flux may also pass through one wall of gas plenum 45. However, the magnetic flux is not as dense in the horizontal plane so the heating action is less pronounced. The purpose of annular heater 43 is to heat the lower portion of wall 29, and the heating action extends about the entire circumference of the spinning cup structure.

Cool gas slot 47 is disposed in a horizontal plane about midway between hot gas generation slot 39 and the upper surface of induction heater 43, The downflowing cool gas thus exerts its guidance action on the hot gas only after the hot gas stream has been fully formed, The cool gas curtain produces only minimal drag effect on the downflowing hot gas, both gas streams moving in the downward direction. The annular cool gas stream is generated in a plane located below the uppermost holes in cup side wall 29. The guidance effect of the cool gas is thus most pronounced on the hot gas stream while the hot gas is passing downwardly across the lowermost holes in wall 29.

The principal features of this invention relate to induction heater 43 and the cool gas curtain generator 45, whereby the extruded glass fibers are more uniformly heated and controlled.

Figure 3:
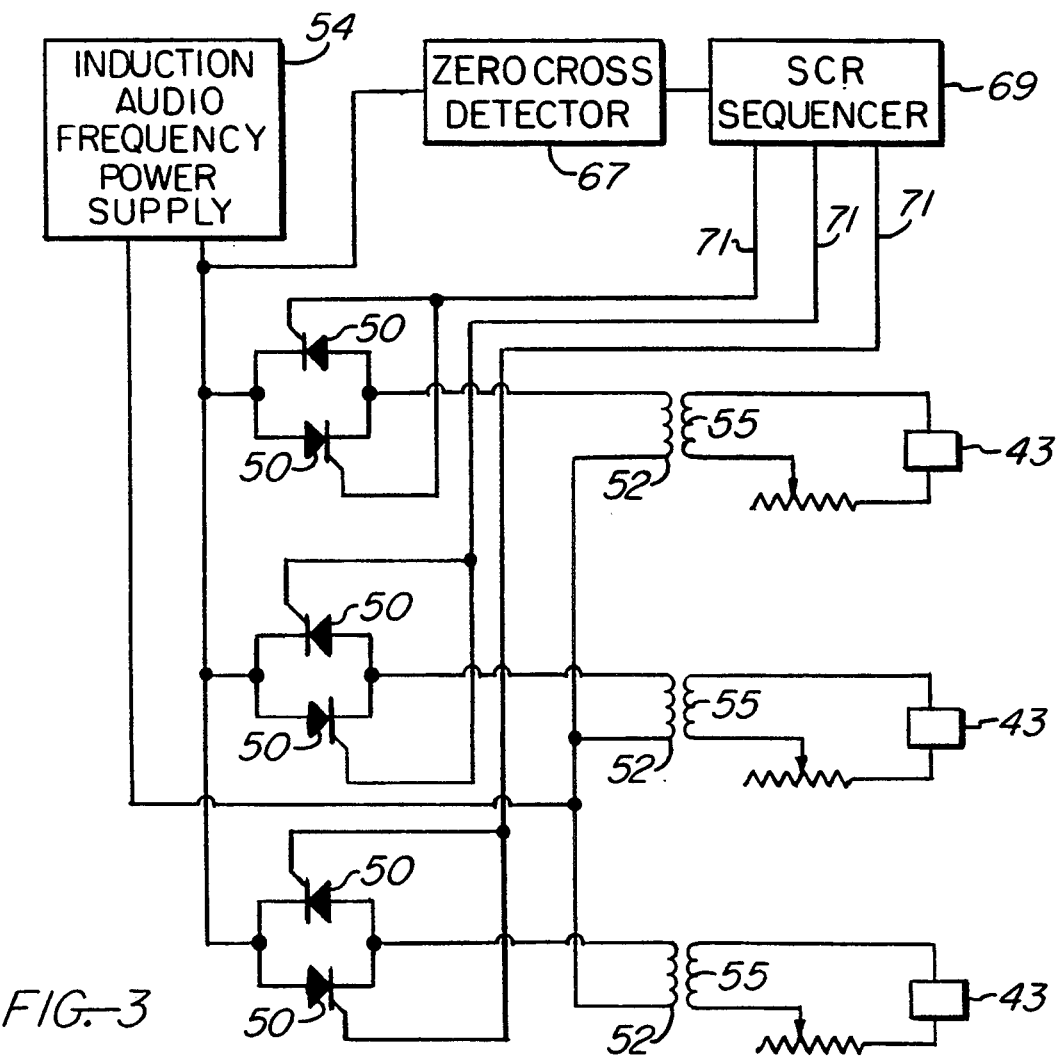
FIG. 3 shows electrical circuitry utilized to control induction heaters of three fiber-producing machines according to FIGS. 1 and 2.

FIG. 3 schematically illustrates an electric circuit utilized to power a multiplicity of induction heaters of the type shown in FIGS. 1 and 2, this circuit being used as a common power supply for three otherwise separate fiber-producing machines. FIG. 3 shows three separate induction heaters 43, one for each fiber-producing machine, although various different numbers of machines can be controlled.

The FIG. 3 circuitry comprises one induction power supply for several high frequency induction heater coils 43, using a time share sequential control system. Silicon controlled rectifiers 50 (or Triacs) serve to switch the power through transformer primaries 52 on a time share basis. A single, medium frequency A.C. power supply 54 supplies power to all three transformers. Each transformer has a secondary winding 55 that delivers high frequency current to the associated heater coil 43. The rectifiers 50 switch power on and off at high speed and in a repeated sequence. Power pulses of about 250 milliseconds may be typical.

The illustrated circuit includes a zero cross reference detector 67 connected to one leg of the power supply, and a sequencer 69 connected to the detector. The sequencer may include a time division multiplexer that delivers control pulses to three lines 71 connected to the three sets of silicon controlled rectifiers 50. The sequencer is timed by detector 67 to deliver current pulses to the respective lines 71 on a cyclical basis, such that the three sets of rectifiers 50 are placed in the conductive state on a specific schedule. The various induction heaters 43 receive energizing current on a time share basis. Each heater 43 can be additionally thermostatically controlled, e.g., by incorporating a thermostat in each line 71. A principal advantage of the illustrated circuit is that a single power supply may be used for three (or more) induction heaters.

Thus there has been shown and described a novel production of glass fibers utilizing a spinning cup structure which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventors claim:

1. The combination comprising:

a multiplicity of glass fiber-producing machines, each comprising a spinning cup structure and an induction heater for heating localized areas of the spinning cup structure to a desired operating temperature, and means for electrically energizing the induction heaters to provide a desired operating temperature for each cup structure, said energizing means comprising a common power supply, controllable rectifier means associated with each induction heater for cyclically turning on and off the power to that heater, and sequencer means for cyclically energizing the plurality of rectifier means on a time share basis.

2. The combination of claim 1, and further comprising:

a zero cross detector connected to the power supply and to said sequencer means for timing said sequencer means.

* * * * *